United States Patent
Baek

(10) Patent No.: US 9,184,425 B2
(45) Date of Patent: Nov. 10, 2015

(54) BATTERY PACK

(75) Inventor: Mooryong Baek, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1193 days.

(21) Appl. No.: 12/651,973

(22) Filed: Jan. 4, 2010

(65) Prior Publication Data

US 2010/0178548 A1    Jul. 15, 2010

Related U.S. Application Data

(60) Provisional application No. 61/144,397, filed on Jan. 13, 2009.

(51) Int. Cl.
*H01M 2/10*    (2006.01)

(52) U.S. Cl.
CPC ............ *H01M 2/105* (2013.01); *H01M 2/1055* (2013.01)

(58) Field of Classification Search
CPC ............................. H01M 2/105; H01M 2/1055
See application file for complete search history.

(56) References Cited

U.S. PATENT DOCUMENTS

| | | |
|---|---|---|
| 4,158,802 A | 6/1979 | Rose, II |
| 4,265,984 A | 5/1981 | Kaye |
| 4,470,652 A | 9/1984 | Schwab |
| 4,510,215 A | 4/1985 | Adam |
| 4,724,189 A | 2/1988 | Chase |
| 4,736,921 A | 4/1988 | Zane et al. |
| 5,677,079 A | 10/1997 | DeZorzi |
| 5,733,674 A | 3/1998 | Law et al. |
| 5,900,332 A | 5/1999 | Marukawa et al. |
| 2003/0064281 A1* | 4/2003 | Andersen et al. .............. 429/121 |
| 2003/0211382 A1 | 11/2003 | Aoyamaz |
| 2005/0070164 A1 | 3/2005 | Mita et al. |
| 2006/0078789 A1 | 4/2006 | Wegner |
| 2006/0270277 A1 | 11/2006 | Zhao et al. |
| 2007/0141452 A1 | 6/2007 | Kim |
| 2008/0182162 A1 | 7/2008 | Kim |
| 2009/0072785 A1 | 3/2009 | Moon |
| 2009/0123819 A1 | 5/2009 | Kim |
| 2009/0123820 A1 | 5/2009 | Han |

(Continued)

FOREIGN PATENT DOCUMENTS

| | | |
|---|---|---|
| EP | 0084338 A | 7/1983 |
| EP | 1 309 019 A2 | 5/2003 |

(Continued)

OTHER PUBLICATIONS

IDPL Machine Translation of JP 2008140730 A.*

(Continued)

*Primary Examiner* — Barbara Gilliam
*Assistant Examiner* — Robert S Carrico
(74) *Attorney, Agent, or Firm* — Knobbe Martens Olson & Bear LLP

(57) ABSTRACT

In a battery pack according to the embodiment of the present invention, when coupling bosses of a second case are coupled to coupling holes of a first case, the first case and the second case can be easily coupled to each other by reducing the thicknesses of some portions of a rib having the coupling holes before the coupling bosses are coupled to the coupling holes. In addition, the first case and the second case can be smoothly coupled to each other at the initial step of coupling the coupling bosses and the coupling holes to each other by opening the outermost portion of the first case facing the top end of the rib having the coupling holes.

22 Claims, 5 Drawing Sheets

(56) References Cited

U.S. PATENT DOCUMENTS

| | | | |
|---|---|---|---|
| 2009/0202897 A1 | 8/2009 | Kim et al. | |
| 2010/0075216 A1* | 3/2010 | Yoo | 429/151 |
| 2010/0119928 A1 | 5/2010 | Yoon | |

FOREIGN PATENT DOCUMENTS

| | | |
|---|---|---|
| EP | 1498964 A | 1/2005 |
| EP | 1 746 679 A1 | 1/2007 |
| EP | 1 705 743 B1 | 9/2007 |
| GB | 2294578 A | 5/1996 |
| JP | 08-293300 | 11/1996 |
| JP | 09-190811 | 7/1997 |
| JP | 10-003950 | 1/1998 |
| JP | 10-106533 | 4/1998 |
| JP | 10-270095 | 10/1998 |
| JP | 11-054157 | 2/1999 |
| JP | 11144766 A2 | 5/1999 |
| JP | 2001-126703 | 5/2001 |
| JP | 2001-155789 | 6/2001 |
| JP | 2001-266818 | 9/2001 |
| JP | 2001-307695 | 11/2001 |
| JP | 2001-345088 | 12/2001 |
| JP | 2001-345089 | 12/2001 |
| JP | 2002-184385 | 6/2002 |
| JP | 2002-298822 | 10/2002 |
| JP | 2002-343320 | 11/2002 |
| JP | 2002-352793 | 12/2002 |
| JP | 2003-109558 | 4/2003 |
| JP | 2003-109675 | 4/2003 |
| JP | 2003-123715 | 4/2003 |
| JP | 2003-257388 A | 9/2003 |
| JP | 2004-087218 | 3/2004 |
| JP | 2004-319314 | 11/2004 |
| JP | 2005-026219 | 1/2005 |
| JP | 2005-349955 | 12/2005 |
| JP | 2006-127921 | 5/2006 |
| JP | 2006-179190 | 7/2006 |
| JP | 2008-140730 A | 6/2008 |
| KR | 0176553 | 4/2000 |
| KR | 10-20010036651 | 5/2001 |
| KR | 1020060028057 | 3/2006 |
| KR | 1020060045008 | 5/2006 |
| KR | 10-2006-0104070 | 10/2006 |
| KR | 1020070006956 | 1/2007 |
| KR | 1020070014658 | 2/2007 |
| KR | 10-20070089615 | 8/2007 |
| TW | M308509 | 3/2007 |
| WO | WO 2007/001345 | 8/2005 |
| WO | WO 2008/093181 | 8/2008 |

OTHER PUBLICATIONS

Extended Search Report dated Aug. 12, 2010 for corresponding application No. EP 08150025.8-2119 / 1953849.

Office Action dated Feb. 29, 2012 for corresponding CN Application No. 20100003922.X.

Office Action dated Apr. 18, 2011 for corresponding KR Application No. 10-2010-0002635.

EP Search Report for related EP Application No. 08168712.1-1227, Feb. 4, 2009.

Notice of Allowance in corresponding KR Patent Application No. 10-2007-0007976, Oct. 17, 2008.

Office Action for corresponding KR 10-2007-0114939, Sep. 23, 2009.

Office Action from Corresponding Chinese Application No. 2008100000225.1, May 8, 2009.

Office Action from corresponding Korean Application No. 10-2007-0114936, Sep. 23, 2009.

Office Action from related Korean Application No. 10-2007-0114935, Sep. 21, 2009.

U.S. Appl. No. 12/177,789, filed Jul. 22, 2008, Dae-Won Han, 2009-0123820, Office Action of Feb. 3, 2010 and response Restriction Requirement of Nov. 16, 2009 and response.

Office Action dated Jul. 17, 2012 for corresponding JP Application No. 2010-005032.

Office Action from Related Application No. KR 10-2008-0098767, dated May 27, 2010.

U.S. Appl. No. 12/177,789, filed Jul. 22, 2008, Dae-Won Han, 2009-0123820, Final Office Action of Jul. 9, 2010 Office Action of Feb. 3, 2010 and response Restriction Requirement of Nov. 16, 2009 and response.

Office Action dated Jun. 11, 2013 for corresponding JP Application No. 2010-005032.

Office Action dated Feb. 4, 2014 for corresponding JP Application No. 2013-103318.

* cited by examiner

BATTERY PACK

CROSS-REFERENCE TO RELATED APPLICATIONS

This application claims the benefit of U.S. Provisional Application Ser. No. 61/144,397, entitled BATTERY PACK, filed Jan. 13, 2009, which is hereby incorporated by reference in its entirety.

BACKGROUND OF THE INVENTION

1. Field of the Invention

The present invention relates to a battery pack.

2. Description of the Related Art

A secondary battery often has one unit battery (one bare cell) but may include a plurality of unit batteries in the form of a group battery to constitute a pack according to an external device to which it is applied.

In the latter case, a plurality of unit batteries are positioned in a case assembly, and the case assembly includes an upper case and a lower case.

Generally, the battery pack is formed by assembling the upper case and the lower case after positioning the unit batteries in the lower case.

SUMMARY OF THE INVENTION

The present invention provides a battery pack that improves the assembling efficiency thereof when a first case and a second case are coupled to each other.

The present invention is not limited to the above-mentioned object, and those skilled in the art can clearly understand other unmentioned objects of the present invention.

In a battery pack according to one embodiment of the present invention, when coupling bosses of a second case are coupled to coupling holes of a first case, the first case and the second case can be easily coupled to each other by reducing the thicknesses of some portions of a rib having the coupling holes before the coupling bosses are coupled to the coupling holes.

In addition, the first case and the second case can be smoothly coupled to each other at the initial step of coupling the coupling bosses and the coupling holes to each other by opening the outermost portion of the first case facing the top end of the rib having the coupling holes.

In one embodiment, a battery pack having a plurality of bare cells is disclosed. In this embodiment, the battery pack comprises a first case that has a first perimeter and at least one first rib disposed inward from the first perimeter, a second case that has at least one second rib, wherein an upper portion of the first perimeter corresponding to an upper portion of the first rib is truncated with respect to the first rib.

In another embodiment a battery pack having a plurality of bare cells is disclosed. In this embodiment the battery pack comprises a first case that has a first perimeter and defines an interior cavity that is sized to at least partially receive the plurality of bare cells and wherein the first case includes at least one first rib defines a plurality of openings wherein the at least one first rib has a first sub-rib and an extending sub-rib, wherein the first sub-rib and the perimeter define a coupling passage therebetween and wherein the extending sub-rib extends outward from the interior cavity of the first case beyond the coupling passage. In this embodiment the battery pack further includes a second case that has a second perimeter and defines an interior cavity that is sized to at least partially receive the plurality of bare cells wherein the second perimeter is adapted to be positioned proximate the first perimeter of the first case to at least partially enclose the bare cells and wherein the second rib defines a plurality of lateral protrusions that are adapted to be positioned through the coupling passage and engage with the plurality of openings in the first sub-rib of the at least one first rib so as to retain the second case adjacent the first case so a to at least partially enclose the bare cells.

In yet another embodiment a battery pack having a plurality of cells is disclosed. In this embodiment, the battery pack comprises a first case that has a first perimeter and defines an interior cavity that is sized to at least partially receive the plurality of bare cells and wherein the first case includes at least one first rib positioned adjacent the first perimeter so as to define a coupling passage therebetween wherein the at least one first rib defines a plurality of first engagement surfaces and wherein the at least one first rib includes a first section that extends outward of the first case beyond the first perimeter of the first case and the coupling passage. In this embodiment, the battery pack further comprises a second case that has a second perimeter and defines an interior cavity that is sized to at least partially receive the plurality of bare cells wherein second perimeter is adapted to be positioned proximate the first perimeter of the first case to at least partially enclose the bare cells and wherein the second case defines at least one second rib that defines a plurality of second engagement surfaces wherein the second engagement surfaces are positioned through the coupling passage and engage with the first engagement surfaces so that the engagement between the first and second engagement surfaces retain the second case adjacent the first case so as to at least partially enclose the bare cells.

BRIEF DESCRIPTION OF THE DRAWINGS

The features and advantages of the present invention will be more apparent from the following detailed description in conjunction with the accompanying drawings, in which.

DETAILED DESCRIPTION OF THE PREFERRED EMBODIMENT

Figure 1:
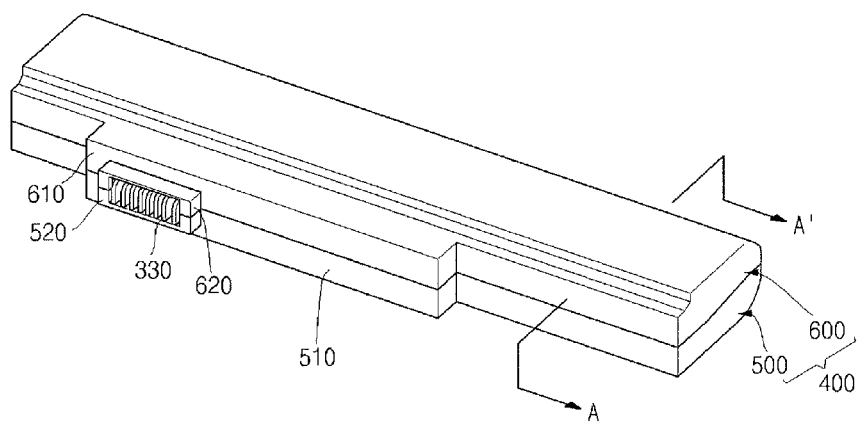
FIG. 1 is a perspective view of a battery pack according to a first embodiment of the present invention.

Details of the following embodiments of the present invention are contained herein and in the accompanying drawings. The advantages and characteristics of the present invention and methods for achieving them will be apparent with reference to the embodiments of the present invention that will be described in detail with reference to the drawings. The same reference numerals are used throughout the specification to refer to the same or like elements.

Hereinafter, a battery pack 10 according to a first embodiment of the present invention will be described in detail with reference to the accompanying drawings.

Figure 2:
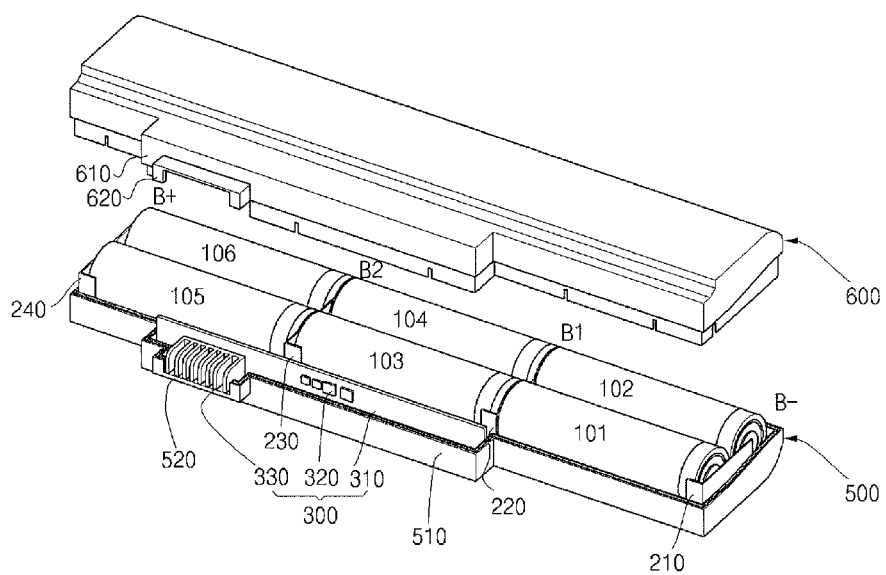
FIG. 2 is an exploded perspective view of the battery pack according to the first embodiment of the present invention.
Figure 3:
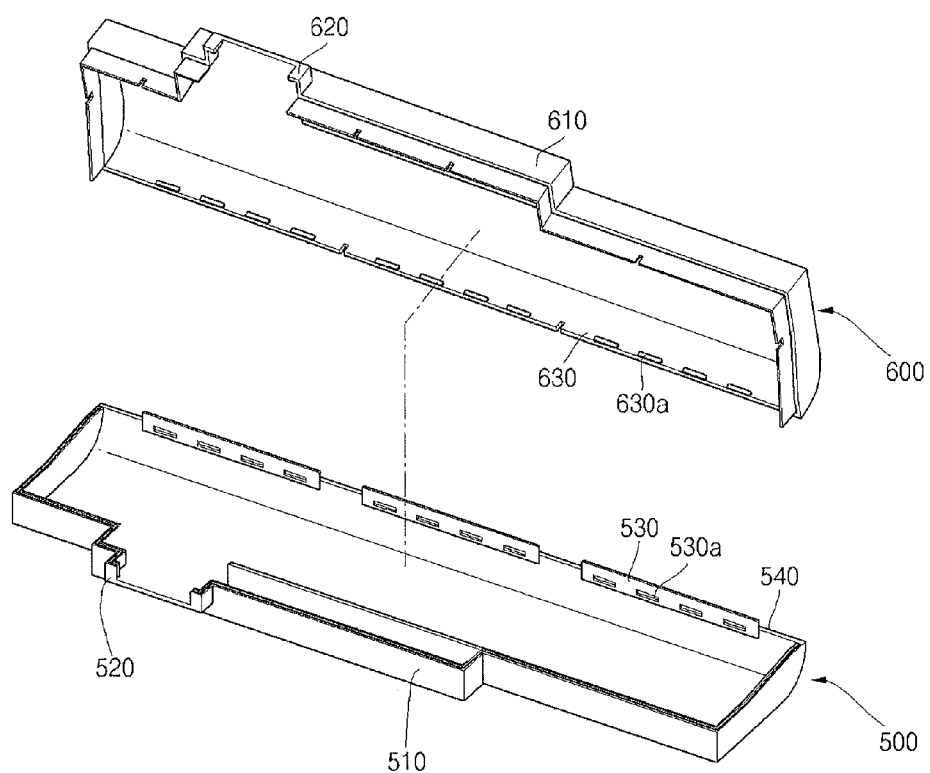
FIG. 3 is an exploded perspective view of a case according to the first embodiment of the present invention.
Figure 4:
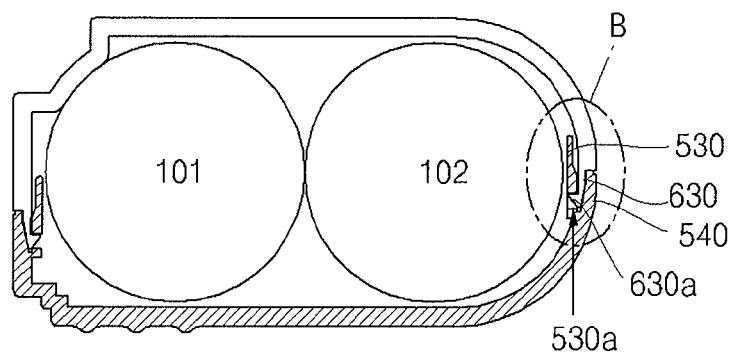
FIG. 4 is a sectional view of the battery pack according to the first embodiment of the present invention.
Figure 5:
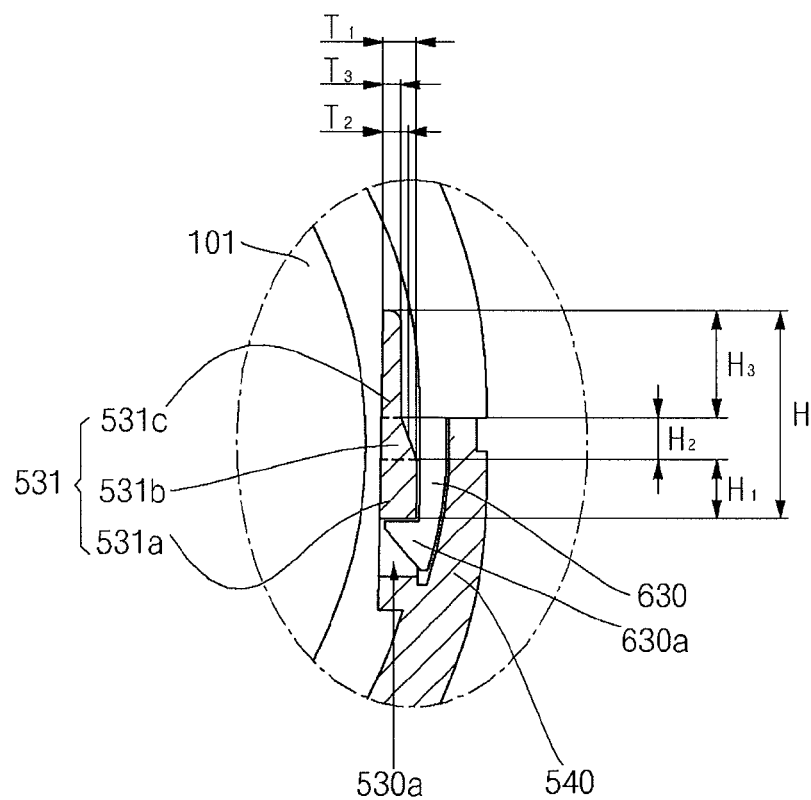
FIG. 5 is an enlarged view of the battery pack according to the first embodiment of the present invention.

FIGS. 1 and 2 are a perspective view and an exploded perspective view of a battery pack 10 according to the first embodiment of the present invention. FIG. 3 is an exploded perspective view of a case according to the first embodiment of the present invention. FIGS. 4 and 5 are a sectional view and an enlarged view of the battery pack 10 according to the first embodiment of the present invention. FIG. 4 is a sectional view taken along line A-A' of FIG. 1. FIG. 5 is an enlarged view obtained by enlarging a portion B of FIG. 4.

Referring to FIGS. 1 and 2, the battery pack 10 according to the first embodiment of the present invention includes a plurality of bare cells 101, 102, 103, 104, 105, and 106, first to fourth lead plates 210, 220, 230, and 240, a protection circuit module 300, and a case assembly 400. The case assembly 400 includes a first case 500 and a second case 600. When coupling bosses of the second case 600 are coupled to coupling holes of the first case 500, the first case 500 and the second case 600 can be easily coupled to each other by reducing the thicknesses of some portions of ribs in which the coupling holes are formed before the ribs are coupled to the coupling bosses. In addition, the first case 500 and the second case 600 can be smoothly coupled to each other in the initial step of coupling the coupling bosses to the coupling holes by opening outermost portions of the first case 500 facing the top ends of the ribs in which the coupling holes are formed.

Each of the bare cells 101, 102, 103, 104, 105, and 106 includes an electrode assembly (not shown), a can accommodating the electrode assembly, and a cap assembly (not shown) coupled to an opening of the can with the electrode assembly being accommodated in the can. The top surfaces and the bottom surfaces of the bare cells are positive electrode terminals and negative electrode terminals respectively, and have the opposite polarity. The first to sixth bare cells 101, 102, 103, 104, 105 and 106 are illustrated in the drawings. The first bare cell 101 and the second bare cell 102 are connected to each other in parallel to constitute a first bare cell set thereby, the third bare cell 103 and the fourth bare cell 104 are connected to each other in parallel to constitute a second bare cell set thereby, and the fifth bare cell 105 and the sixth bare cell 106 are connected to each other in parallel to constitute a third bare cell set thereby. Here, the first to third bare cell sets are connected to each other in series, and are defined by 3 series-2 parallel structure for convenience' sake. Although 3 series-2 parallel structure is illustrated in the embodiment of the present invention, any structure having more than two bare cells is possible with departing the sprit of the present invention.

In FIG. 2, B+ and B− are high current terminals and indicate power sources of opposite ends of the series-parallel structure of the bare cells. B+ is the highest potential terminal as a positive electrode power source and B− is the lowest potential terminal as a negative terminal power source. Hence, the negative electrode terminal of the first bare cell set may be the lowest potential terminal B− and the positive electrode terminal of the third bare cell set may be the highest potential terminal B+.

Of the first to fourth lead plates, the first lead plate 210 and the fourth lead plate 240 are located in the negative electrode terminal B− of the first bare cell set and the positive electrode terminal B+ of the third bare cell set respectively to connect the bare cell sets in parallel. Then, the first lead plate 210 and the fourth lead plate 240 have rectangular flat plate structures.

The first lead plate 210 is welded to the negative electrode terminal of the first bare cell set to be electrically connected to it, and the fourth lead plate 240 is welded to the positive electrode terminal of the third bare cell set to be electrically connected to it. The first lead plate 210 and the fourth lead plate 240 are made of an electrically conductive metal such as copper, nickel, and aluminum. The first lead plate 210 and the fourth lead plate 240 are electrically connected to a pad (not shown) of the protection circuit module 300 directly or through a separate tab.

The second lead plate 220 and the third lead plate 230 are located between the first bare cell set and the second bare cell set B1 and between the second bare cell set and the third bare cell set B2 respectively, and a plurality of bare cell sets are connected to each other in series and in parallel. Here, the second lead plate 220 and the third lead plate 230 have bent central portions respectively. Hence, the second lead plate is welded to the positive electrode terminal of the first bare cell set and the negative electrode terminal of the second bare cell set to be electrically connected to them, and the third lead plate 230 is welded to the positive electrode terminal of the second bare cell set and the negative electrode terminal of the third bare cell set. The second lead plate 220 and the third lead plate 230 may be made of an electrically conductive metal such as copper, nickel, and aluminum. The second lead plate 220 and the fourth lead plate 230 are electrically connected to the pad of the protection circuit module 300 directly or through a separate tab.

The protection circuit module 300 includes a board 310, a protection circuit device 320, a connector 330, and a pad (not shown).

The board 310 is a printed circuit board 310 having a substantially rectangular shape. A conductive metal pattern (not shown) is formed in the board 310, and is electrically connected to the protection circuit device 320, the connector 330, and the pad.

The protection circuit board 320 is located on one surface of the board 310 facing the outside of the battery pack 10, and protects the battery pack 10 by checking information regarding the charge/discharge state of the bare cells, and the current, voltage, temperature of the battery.

The connector 330 is located on one surface of the board 310 facing the outside of the battery pack 10 and is positioned on a positioning portion of the connector 330 of the first case 500. The connector 330 functions as an electrical passage connected to an external electronic device.

The pad is located on one surface of the board 310 facing the bare cells and is electrically connected to the first to fourth lead plates 210, 220, 230, and 240.

Referring to FIGS. 3 and 4, the case assembly 400 includes a first case 500 in which the bare cells 101, 102, 103, 104, 105, and 106, the lead plates 210, 220, 230, and 240, and the protection circuit module 300 are positioned and a second case 600 covering the first case 500. A side of the case assembly 400 facing a side on which the connector 330 is formed is defined as a first side and a side of the case assembly 400 on which the connector 330 is formed is defined as a second side.

The first case 500 has an open-topped box-like shape for accommodating the bare cells. A protection circuit module positioning section 510 corresponding to the shape of the protection circuit module 300 to accommodate the protection circuit module 300 thereby is formed on the second side of the first case 500. A connector positioning section 520 in which the connector 330 of the protection circuit module 300 is positioned is formed in the protection circuit module positioning section 510.

The second case 600 is located on the first case 500 and covers the first case 500. The second case 600 has an open-bottomed box-like shape for accommodating the bare cells. A protection module cover 610 corresponding to the shape of the protection circuit module 300 to cover the protection circuit module 300 is formed on the second side of the second case 600. A connector cover 620 in which the connector 330 of the protection circuit module 300 is positioned is formed in the protection circuit module cover 610.

First ribs 530 having a plurality of coupling holes 530a are formed on the first or second side of the first case 500. Second ribs 630 having coupling bosses 630a coupled to the coupling holes 530a at positions corresponding to the coupling holes 530a are formed on the first or second side of the second case 600. That is, the coupling holes 530a and the coupling bosses 630a are formed on one side of the first and second sides of the case assembly 400, but they may be formed on both of the first and second sides.

Hereinafter, the structure in which the coupling bosses 630a are coupled to the coupling holes 530a will be described in detail. The structure in which the coupling bosses 630a are coupled to the coupling holes 530a is the same on both of the first and second sides of the case assembly 420. Since the coupling holes 530a and the coupling bosses 630a on the first side of the case assembly 400 are illustrated in more detail, only the structure in which the coupling bosses 630a are coupled to the coupling holes 530a on the first side of the case assembly 400 will be described.

Referring to FIG. 5 together with FIG. 3, in the battery pack 10 according to the embodiment of the present invention, the first ribs 530 having a rectangular shape are located on the first side of the first case assembly 500 and the coupling holes 530a having a rectangular shape are formed at lower portions of the first ribs 530. Each of the first ribs 530 includes a first upper rib 531 located on the upper side of the coupling holes 530a and a first lower rib 532 located on the lower side of the coupling holes 530a according to the positions of the coupling holes 530a. Although three first ribs 530 and twelve coupling holes 530a are illustrated in the drawings, the numbers of the first ribs 530 and the coupling holes 530a may be changed according to the number of the bare cells and the size of the case assembly.

The second ribs 630 are located on the first side of the second case 600, and the hook-shaped coupling bosses 630a are formed at lower portions of the second ribs 630. The second ribs 630 are coupled to a coupling passage between the upper ribs 531 and the outermost portion 540 of the first case 540, and the coupling bosses 630a are coupled to the coupling holes 530a. Each of the second ribs 630 has a rectangular shape, and each of the coupling bosses 630a has a triangular cross-section. Then, it is necessary to make the thickest portions of the coupling bosses 630a thicker than the width of the coupling passage, in order to prevent separation of the coupling bosses 630a from the coupling holes 530a after the coupling bosses 630a are coupled to the coupling holes 530a. Although three second ribs 630 and twelve coupling holes 630a are illustrated in the drawings, the numbers of the second ribs 630 and the coupling holes 530a may be changed according to the number of the bare cells and the size of the case assembly.

Each of the first upper ribs 531a includes a first sub-rib 531a located on the upper side of the coupling holes 530a, a second or interconnecting sub-rib 531b located on the upper side of the first sub-rib 531a and whose thickness becomes smaller as it goes toward the inner side of the battery pack 10, and a third or extending sub-rib 531c located on the upper side of the second sub-rib 531b. Here, the height H1 of the first sub-rib 531a is one third of the entire height H of the first upper rib 531 and the sum of the height H2 of the second or interconnecting sub-rib 531b and the height H3 of the third or extending sub-rib 531c is two thirds of the entire height H of the first upper rib 531.

In the first case 500 of the battery pack 10 according to the embodiment of the present invention, of the top portion of the outermost portion 540 corresponding to the third sub-rib 531c is opened or truncated. In other words, the outermost portion 540 of the first case 500 is formed only to the height of the second or interconnecting sub-rib 531b and is not formed in a region corresponding to the third or extending sub-rib 531c.

Accordingly, since the outermost portions of the first case 500 facing the first sub-ribs 531 are opened according to the embodiment of the present invention instead of conventionally forming all the outermost portions at positions where they face first ribs so that coupling passages are formed from the first ribs of the first case, the coupling bosses 630a are not interfered by the outermost portions of the first case 500 when the coupling bosses 630a pass through the third or extending sub-ribs 531c to be coupled to the coupling holes 530a thereby. Therefore, the first case 500 and the second case 600 can be smoothly coupled to each other until the coupling bosses 630a reach the second or interconnecting sub-ribs 531b after the initial entry step of coupling the coupling bosses 630a to the coupling holes 530a.

The thickness of the first upper rib 531 becomes thinner as it goes from the first sub-rib 531a to the third or extending sub-rib 531c. Then, the thickness T3 of the third or extending sub-rib 531c is 0.35 to 0.45 mm. When the thickness of the third rib 531c is smaller than 0.35 mm, the first upper rib 531 may be broken because the first upper rib 531 cannot endure the pressure applied when the coupling boss 630a descends while making contact with the third or extending sub-rib 531c to be coupled to the coupling holes 530a thereby. On the other hand, when the thickness of the third or extending sub-rib 531c is larger than 0.45 mm, interference can be generated between the coupling bosses 630a and the third or extending sub-rib 531c until the coupling bosses 630a is coupled to the coupling holes 530a because the third or extending sub-rib 531c makes contact with the bare cell while the coupling bosses 630a are descending, making contact with the third sub-rib 531c.

The thickness T2 of the second or interconnecting sub-rib 531b becomes gradually smaller as the second or interconnecting sub-rib 531b goes toward the inner side of the battery pack 10. In other words, when the coupling bosses 630a make contact with the second or interconnecting sub-rib 531b, one surface of the second or interconnecting sub-rib 531b making contact with the coupling bosses 630a has an inclination of the same polarity as that of surfaces of the coupling bosses 630a making contact with the second or interconnecting rib 531b. Preferably, one surface of the second or interconnecting sub-rib 531b making contact with the coupling bosses 630a has the same inclination as that of surfaces of the coupling bosses 630a making contact with the second or interconnecting rib 531b. Under the above-mentioned structure, the coupling bosses 630a can pass through the third or extending sub-rib 531c and smoothly enter the coupling passage between the first sub-rib 531a and the outermost portion 540 of the first case 500.

The thickness T1 of the first sub-rib 531a is 0.5 to 0.7 mm. As mentioned above, it is necessary to make the thickest portions of the coupling bosses 630a thicker than the coupling passage between the first sub-rib 531a and the outermost portion of the first case 500, in order to prevent separation of the coupling bosses 630a from the coupling holes 530a after coupling of the coupling bosses 630a to the coupling holes 530a. Accordingly, the width between the first sub-rib 531a and the outermost portion of the first case 500 is made widened by the thickest portions of the coupling bosses 630a when the coupling bosses 630a pass through the coupling passage. In this case, when the thickness of the first sub-rib 531a is smaller than 0.5 mm, the first upper rib 531 cannot endure the pressure by which the coupling bosses 630a enters the coupling passage and may be broken. When the thickness of the first rib 531a is larger than 0.7 mm, since when the first sub-rib 531a is widened, it makes contact with the bare cell 101, it cannot be widened any more and the coupling bosses 630a cannot pass through the coupling passage.

The height H1 of the first sub-rib 531a is 2 to 3.5 mm. In the battery pack 10 according to the embodiment of the present invention, the coupling forces between the first case 500 and the second case 600 can be maintained by not only the coupling structure between the coupling bosses 630a and the coupling holes 530a but also by the frictional forces between the second rib 630 and the first sub-rib 531a and between the second ribs 630 and the outermost portion of the first case 500. However, since when the height of the first sub-rib 531a is smaller than 2 mm, the length of the coupling passage between the first sub-rib 531a and the outermost portion 540 of the first case 500 becomes smaller, the area where the second ribs 630 make contact with the first sub-lib 531a and the outermost portion 540 of the first case 500 becomes smaller. Accordingly, the coupling force between the first case 500 and the second case 600 can be reduced. On the other hand, when the height of the first sub-rib 531a is larger than 3.5 mm, the coupling bosses 630a cannot reach the coupling holes 530a or the first upper lib 531 or the second lib 630 may be broken due to the frictional forces between the second ribs 630 and the first sub-ribs 531a and between the second rib 630 and the outermost portion 540 of the first case 500 while the coupling bosses 630a are passing through the coupling passage between the first sub-rib 531a and the outermost portion 540 of the first case 500 to couple the coupling bosses 630a to the coupling holes 530a.

Under the above-mentioned structure, in the battery pack 10 according to the embodiment of the present invention, when the coupling bosses 630a are coupled to the coupling holes 530a of the first case 500, the first case 500 and the second case 600 can be coupled to each other by making the thicknesses of some portions of the first ribs 530 thinner and opening the outermost portion of the first case 500.

Figure 6:
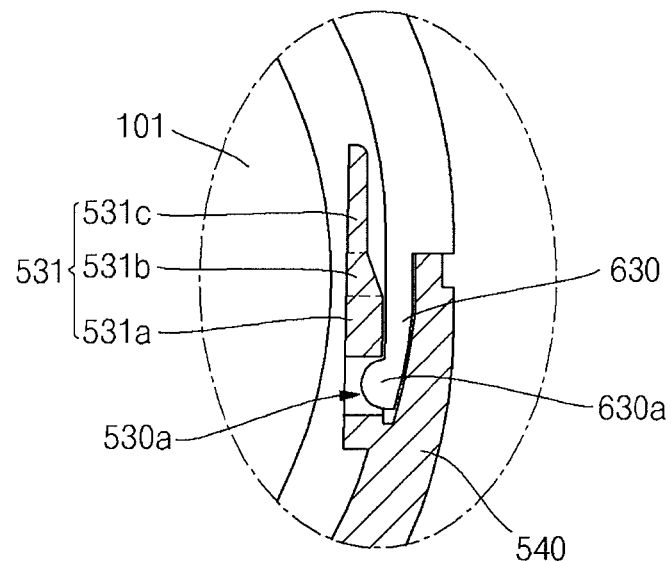
FIG. 6 is an enlarged view of a second embodiment of the invention.

FIG. 6 is an enlarged view of a second embodiment of the present invention. This view corresponds generally to FIG. 5 of the first embodiment.

With the exception of the features shown in FIG. 6, all other features of this embodiment are identical to those of the first embodiment and they will therefore not be discussed further.

The second embodiment differs from the first embodiment in that the shape of the coupling bosses 630a is semicircular in cross-section. This particular profile affords a particularly smooth coupling action between the coupling boss 630a and the first rib 530, because it is less influenced by the relative angles of orientation of the first ribs 530 and the second ribs 630.

For the avoidance of doubt, many other profiles are possible for the coupling bosses 630a. This particular embodiment is illustrated merely as an example of one of these.

Figure 7:
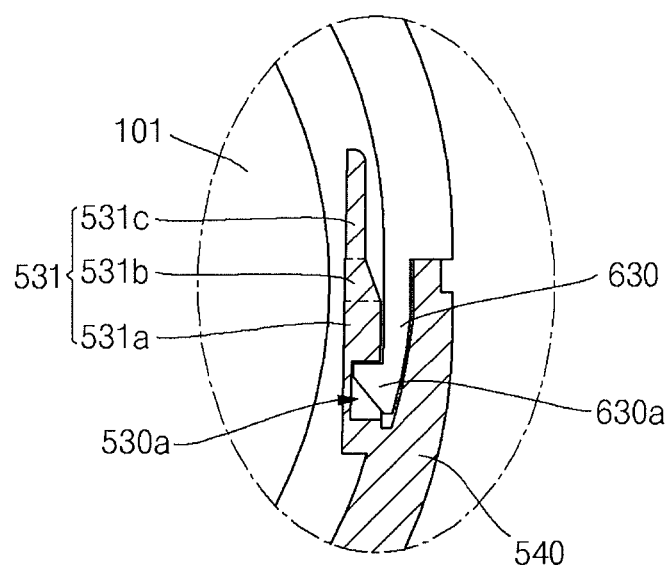
FIG. 7 is an enlarged view of a third embodiment of the invention.

FIG. 7 is an enlarged view of a third embodiment of a battery pack in accordance with the invention. This view corresponds generally with FIG. 5 of the first embodiment. Except for the specific features illustrated in FIG. 7, this embodiment is identical in all other respects to the first embodiment. As a consequence, these common features will not be described again.

The primary difference between the third embodiment and the first embodiment is that the coupling holes 530a of the first embodiment are replaced with coupling recesses 530a. The primary advantage of this embodiment is that the recesses provide greater structural integrity to the first ribs 530.

Figure 8:
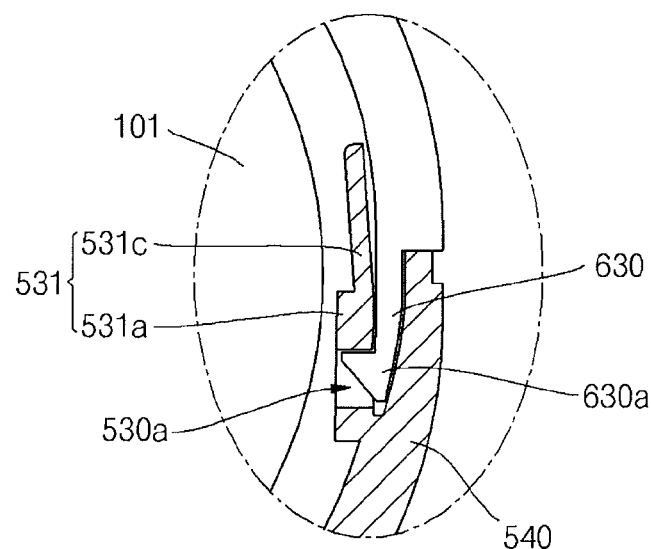
FIG. 8 is an enlarged view of a fourth embodiment of the invention.

FIG. 8 is an enlarged view of part of a fourth embodiment of the invention. This view corresponds generally with that of FIG. 5 of the first embodiment. Except for the differences illustrated in FIG. 8, this embodiment is identical in all other respects with the embodiment of FIG. 1. The common features will not be discussed in detail again.

The fourth embodiment differs from the first embodiment in that the second sub rib 531b is omitted and the third sub rib 531c is directly connected to the first sub rib 531a. The height of the third sub rib 531c is, in this case, extended so as to correspond to the sum of the heights of the third sub rib 531c and the second sub rib 531b of the first embodiment. In other words, in this embodiment, the third sub rib 531c has a height of H3+H2. The third sub rib is also somewhat inclined, with the direction of the inclination being generally similar to that of the inclined surface of the second sub rib of the first embodiment. The reason for this is to provide a bearing surface that offers a guiding function to the coupling bosses 630a as they are directed towards the channel. The inclination enables the boundary between the first and third sub rib to be flush, and the inclination also provides some flaring of the entrance to the channel.

Figure 9:
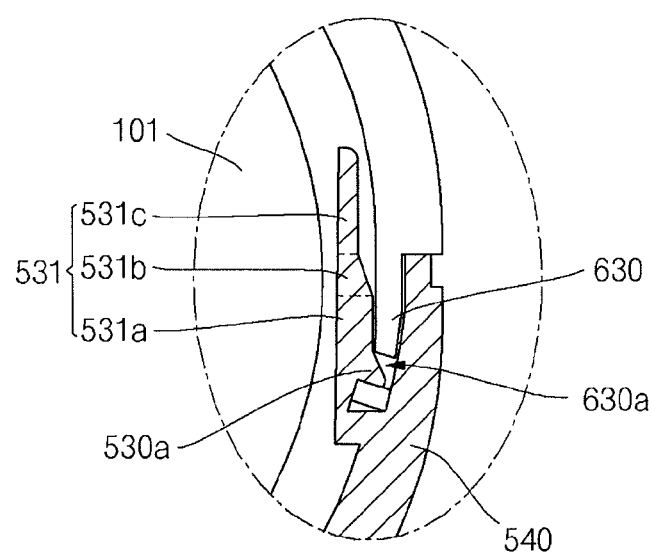
FIG. 9 is an enlarged view of a fifth embodiment of the invention.

FIG. 9 is an enlarged view of a fifth embodiment of the invention. This view corresponds generally with FIG. 5 of the first embodiment.

Except for the differences illustrated in FIG. 9, this embodiment is identical in all other respects to the first embodiment and the common features will not be described again.

In the embodiment of FIG. 9, the positions of the coupling boss and the coupling holes have been reversed. That is to say the first ribs 530 are provided with coupling bosses 530a and the second ribs 630 are provided with coupling holes 630a.

Although embodiments of the present invention have been described in detail hereinabove, it should be understood that many variations and modifications of the basic inventive concept herein described will still fall within the spirit and scope of the present invention as defined in the appended claims. In particular the features of the various embodiments can be combined to form further embodiments.

What is claimed is:

1. A battery pack having a plurality of bare cells, the battery pack comprising:
   a first case that has a base and a side wall that extends in a first direction from the base wherein the side wall includes a first perimeter and at least one first rib disposed inward from the first perimeter, and
   a second case that has at least one second rib,
   wherein the first rib comprises a first sub-rib, an extending sub-rib and an interconnecting sub-rib interposed therebetween
   wherein an upper portion of the first perimeter corresponding to the extending sub-rib is truncated with respect to the extending sub-rib so that the first rib extends further than the first perimeter in a first direction and wherein the interconnecting sub-rib includes an inclined surface that is interposed between the first sub-rib and the extending sub-rib and wherein the first sub-rib is thicker than the extending sub-rib and defines a plurality of openings that are located below the level of the first perimeter in a second direction opposite the first direction and the second rib defines a plurality of coupling bosses that extend into the openings with the plurality of coupling bosses being interposed between the first perimeter and the first sub-rib and wherein the space between the interconnecting sub-rib of the first rib and the first perimeter is dimensioned to be smaller than the thickness of the coupling boss and the second rib.

2. The battery pack of claim 1, wherein the upper portion of the first perimeter extends only to the height of the interconnecting sub-rib of the first rib.

3. A battery pack having a plurality of bare cells, the battery pack comprising:
   a first case that has a base and a sidewall that extends in a first direction from the base wherein the side wall includes a first perimeter extending in the first direction and defines an interior cavity that is sized to at least partially receive the plurality of bare cells and wherein the first case includes at least one first rib which defines a plurality of openings that are located below the level of an upper end of the first perimeter in a second direction opposite the first direction wherein the at least one first rib has a first sub-rib, an extending sub-rib and an interconnecting sub-rib interposed therebetween and the first sub-rib is thicker than the extending sub-rib, wherein the interconnecting sub-rib includes an inclined surface, wherein the first sub-rib and the interconnecting sub-rib of the first rib and the first perimeter define a coupling passage therebetween and wherein the extending sub-rib extends outward from the interior cavity of the first case beyond the coupling passage; and
   a second case that has a second perimeter and defines an interior cavity that is sized to at least partially receive the plurality of bare cells wherein the second case includes at least one second rib, and wherein the second perimeter is adapted to be positioned proximate the first perimeter of the first case to at least partially enclose the bare cells and wherein the second rib defines a plurality of coupling bosses that are adapted to be positioned through the coupling passage and engage with the plurality of openings in the first sub-rib of the at least one first rib so as to retain the second case adjacent the first case so as to at least partially enclose the bare cells wherein the plurality of openings are located on the first rib so that the plurality of openings are connected to the coupling passage and wherein the coupling passage is dimensioned to be smaller than the thickness of the coupling bosses and the second rib.

4. The battery pack of claim 3, wherein the coupling passage defines a first cross-sectional dimension and coupling bosses and the at least one second rib defines a protrusion having a second cross-sectional dimension that is greater than the first cross-sectional dimension so that the engagement of the plurality of openings and the plurality of protrusions retains the first and second cases in proximity to each other.

5. The battery pack of claim 3, wherein the plurality of openings and the plurality of protrusions are adapted to be positioned about the first and second perimeters of the first and second cases.

6. The battery pack of claim 5, wherein the extending sub-rib of the at least one first rib is sized so as to be spaced from the second perimeter of the second case so as to define a space of a third cross-sectional dimension that is greater than a first cross-sectional dimension of the coupling passage.

7. The battery pack of claim 5, wherein the cross-sectional dimension of the interconnecting sub-rib transitions from the cross-sectional dimension of the first sub-rib to the cross-sectional dimension of the extending sub-rib surfaces so as to define a first contour.

8. The battery pack of claim 7, wherein the second rib defines a sub-rib having a cross-sectional dimension and the protrusion defines a cross-sectional dimension that is greater than the cross-sectional dimension of the sub-rib of the second rib.

9. The battery pack of claim 8, wherein the second rib defines a transitional sub-rib between the sub-rib and the protrusion wherein the cross-sectional dimension of the transitional sub-rib transitions from the cross-section dimension of the sub-rib to the cross-sectional dimension of the protrusion so as to define a second contour that corresponds to the first contour.

10. The battery pack of claim 9, wherein the thickness of the interconnecting sub-rib of the first rib is approximately 0.35 mm to 0.45 mm and wherein the thickness of the first sub-rib of the first rib is approximately 0.5 mm to 0.7 mm.

11. The battery pack of claim 10, wherein the first sub-rib of the first rib extend towards the second case a distance that is ⅓ the distance of the length of the first rib.

12. The battery pack of claim 10, wherein the first sub-rib extends towards the second case a distance that is between 2 mm to 3.5 mm.

13. The battery pack of claim 7, wherein a thickness of the first sub-rib of the first rib is bigger than that of the interconnecting sub-rib and a thickness of the interconnecting sub-rib is bigger than that of the extending sub-rib.

14. A battery pack having a plurality of bare cells, the battery pack comprising:
   a first case that has a base and a side wall that extends in a first direction from the base wherein the side wall has a first perimeter and defines an interior cavity that is sized to at least partially receive the plurality of bare cells and wherein the first case includes at least one first rib positioned adjacent the first perimeter so as to define a coupling passage therebetween wherein the at least one first rib defines a plurality of first engagement surfaces that are positioned within the coupling passage below the level of an upper end of the first perimeter in a second direction opposite the first direction and wherein the at least one first rib includes a first sub-rib, an extending sub-rib and an interconnecting sub-rib interposed therebetween wherein the first sub-rib is thicker than the extending sub-rib, wherein the first engagement surfaces of the first sub-rib including openings, wherein the first engagement surfaces of the interconnecting sub-rib including a inclined surface, wherein the extending sub-rib extends outward of the first case beyond the first perimeter of the first case and the coupling passage;
   a second case that has a second perimeter and defines an interior cavity that is sized to at least partially receive the plurality of bare cells wherein second perimeter is adapted to be positioned proximate the first perimeter of the first case to at least partially enclose the bare cells and wherein the second case defines at least one second rib that defines a plurality of second engagement surfaces wherein the second engagement surfaces comprise coupling bosses that are positioned through the coupling passage and engage with the first engagement surfaces so that the engagement between the first and second engagement surfaces retain the second case adjacent the first case so as to at least partially enclose the bare cells and the coupling passage is dimensioned to be smaller than the thickness of the coupling bosses and the second rib.

15. The battery pack of claim 14, wherein the second engagement surfaces of the at least one second rib comprise protrusions that extend laterally outward from the second rib so as to be positionable into the openings in the at least one first rib.

16. The battery pack of claim 15, wherein the openings comprise recesses.

17. The battery pack of claim 15, wherein the openings comprise through-going holes.

18. The battery pack of claim 15, wherein coupling bosses comprise protrusions having a profile comprised of a triangular, saw toothed or arcuate component.

19. A battery pack having a plurality of bare cells, the battery pack comprising:
  a first case having a base and a side wall that extends in a first direction from the base wherein the side wall is provided with at least one first rib; and
  a second case provided with at least one second rib;
  wherein:
  the first rib takes the form of a flange situated adjacent an outer most portion of the first case, but spaced therefrom along at least a part of its length, so as to form a channel therebetween;
  the second rib projects from the second case portion for location within the channel;
  the first ribs is provided with a female element; and
  the second ribs is provided with a male element comprising a coupling boss that is adapted to locate within the female element to join the two case portions together wherein the engagement between the male and female element occurs in the channel;
  wherein:
  the first rib has a first sub rib, a third sub rib and a second sub rib interposed therebetween, wherein the female element is located on the first sub rib, wherein the second sub rib including a guide surface and wherein the third sub rib extends from the second sub rib beyond the channel in the first direction and the first sub rib has a thickness that is greater than that of the third sub rib and wherein the male and female elements are coupled together at a level below an upper end of the outer most portion of the first case in a second direction opposite the first direction and wherein the channel is dimensioned so as to be smaller than the male element.

20. A battery pack of claim 19, wherein the guide surface of the second sub rib is aligned in a direction that is inclined relative to a plane in which the first and second cases are joined and extends from the channel towards an inner portion of the first case.

21. A battery pack of claim 19, wherein the female element comprises an opening that extends partially or completely through the case in which it is situated.

22. A battery pack of claim 19, wherein the male element comprises a protrusion having a profile that comprises a triangular, saw-toothed or arcuate component.

* * * * *